United States Patent
Kim et al.

(10) Patent No.: US 11,323,984 B2
(45) Date of Patent: May 3, 2022

(54) METHOD AND APPARATUS FOR PROVIDING INFORMATION ABOUT AVAILABLE WIRELESS RESOURCES AND DETERMINING THE WIRELESS RESOURCES USED FOR DATA TRANSMISSION

(71) Applicant: Samsung Electronics Co., Ltd., Gyeonggi-do (KR)

(72) Inventors: Youn-Sun Kim, Gyeonggi-do (KR); Hyoung-Ju Ji, Seoul (KR); Hyo-Jin Lee, Seoul (KR); Yong-Jun Kwak, Gyeonggi-do (KR); Young-Bum Kim, Seoul (KR); Ju-Ho Lee, Gyeonggi-do (KR); Joon-Young Cho, Gyeonggi-do (KR); Seung-Hoon Choi, Gyeonggi-do (KR); Cheng Shan, Gyeonggi-do (KR); Krishna Sayana, Garland, TX (US)

(73) Assignee: Samsung Electronics Co., Ltd

(*) Notice: Subject to any disclaimer, the term of this patent is extended or adjusted under 35 U.S.C. 154(b) by 206 days.

(21) Appl. No.: 13/630,535

(22) Filed: Sep. 28, 2012

(65) Prior Publication Data

US 2013/0094442 A1 Apr. 18, 2013

Related U.S. Application Data

(60) Provisional application No. 61/692,526, filed on Aug. 23, 2012, provisional application No. 61/610,152, (Continued)

(51) Int. Cl.
*H04W 72/04* (2009.01)
*H04L 5/00* (2006.01)

(52) U.S. Cl.
CPC ....... *H04W 72/0406* (2013.01); *H04L 5/0035* (2013.01); *H04L 5/0094* (2013.01); *H04L 5/0048* (2013.01)

(58) Field of Classification Search
CPC ............. H04W 72/0406; H04L 5/0035; H04L 5/0094; H04L 5/0048
See application file for complete search history.

(56) References Cited

U.S. PATENT DOCUMENTS

2009/0083424 A1    3/2009  Frederiksen et al.
2009/0252077 A1*  10/2009  Khandekar ......... H04W 72/082
                                                        370/312
(Continued)

FOREIGN PATENT DOCUMENTS

CN    101741442    6/2010
CN    101874378   10/2010
(Continued)

OTHER PUBLICATIONS

Zte, "Further Consideration on PDSCH Starting Position", R1-111505, 3GPP TSG-RAN WG1 #65, May 9-13, 2011.
(Continued)

*Primary Examiner* — Jael M Ulysse
(74) *Attorney, Agent, or Firm* — The Farrell Law Firm, P.C.

(57) ABSTRACT

A User Equipment (UE) in a wireless communication system using a Coordinated Multi-Point transmission/reception (CoMP) scheme receives Downlink Control Information (DCI) including CoMP control information, determines a starting position of a data channel on wireless resources, based on starting position information of a data channel included in the CoMP control information and used in each of a plurality of cells, and receives data from the plurality of cells starting from the determined starting position.

12 Claims, 9 Drawing Sheets

Related U.S. Application Data filed on Mar. 13, 2012, provisional application No. 61/607,697, filed on Mar. 7, 2012, provisional application No. 61/541,417, filed on Sep. 30, 2011.

(56) References Cited

U.S. PATENT DOCUMENTS

| | | | |
|---|---|---|---|
| 2010/0074195 A1* | 3/2010 | Cheng | H04L 1/0003 370/329 |
| 2010/0195566 A1* | 8/2010 | Krishnamurthy | H04L 5/0007 370/328 |
| 2010/0195599 A1* | 8/2010 | Zhang | H04L 5/0094 370/329 |
| 2010/0227569 A1* | 9/2010 | Bala | H04L 5/0007 455/73 |
| 2010/0232373 A1* | 9/2010 | Nory | H04W 72/1289 370/329 |
| 2010/0238821 A1* | 9/2010 | Liu | H04L 43/045 370/252 |
| 2010/0246499 A1* | 9/2010 | Kim | H04W 72/1289 370/329 |
| 2010/0246527 A1* | 9/2010 | Montojo | H04L 25/0226 370/330 |
| 2010/0260151 A1* | 10/2010 | Onggosanusi | H04W 36/18 370/336 |
| 2010/0273506 A1* | 10/2010 | Stern-Berkowitz | G01S 5/0009 455/456.1 |
| 2010/0331030 A1* | 12/2010 | Nory | H04L 5/0053 455/509 |
| 2010/0331037 A1* | 12/2010 | Jen | H04W 52/146 455/522 |
| 2011/0002282 A1* | 1/2011 | Inoue | H04W 72/0406 370/329 |
| 2011/0007695 A1* | 1/2011 | Choi | H04L 5/0007 370/329 |
| 2011/0026473 A1* | 2/2011 | Luo | H04L 5/0035 370/329 |
| 2011/0044259 A1* | 2/2011 | Nimbalker | H04L 5/001 370/329 |
| 2011/0051654 A1* | 3/2011 | Blankenship | H04B 7/2606 370/315 |
| 2011/0096734 A1 | 4/2011 | Damnjanovic et al. | |
| 2011/0170458 A1 | 7/2011 | Chen et al. | |
| 2011/0170496 A1* | 7/2011 | Fong | H04L 5/0053 370/329 |
| 2011/0194478 A1* | 8/2011 | Lee | H04W 74/002 370/312 |
| 2011/0194514 A1* | 8/2011 | Lee | H04L 5/0057 370/329 |
| 2011/0194523 A1 | 8/2011 | Chung et al. | |
| 2011/0199986 A1* | 8/2011 | Fong | H04L 5/0035 370/329 |
| 2011/0205978 A1* | 8/2011 | Nory | H04L 5/0007 370/329 |
| 2011/0206014 A1* | 8/2011 | Lee | H04L 1/08 370/335 |
| 2011/0235603 A1* | 9/2011 | Cheng | H04L 5/0032 370/329 |
| 2011/0237270 A1* | 9/2011 | Noh | H04B 7/0413 455/450 |
| 2011/0243047 A1* | 10/2011 | Dayal | H04W 16/14 370/311 |
| 2011/0255485 A1* | 10/2011 | Chen | H04W 72/0453 370/329 |
| 2011/0268046 A1* | 11/2011 | Choi | H04L 5/0053 370/329 |
| 2011/0268077 A1* | 11/2011 | Wan | H04J 11/0053 370/329 |
| 2011/0286406 A1* | 11/2011 | Chen | H04L 1/1861 370/329 |
| 2011/0310818 A1* | 12/2011 | Lin | H04W 72/042 370/329 |
| 2011/0317645 A1* | 12/2011 | Jen | H04W 52/60 370/329 |
| 2012/0039220 A1* | 2/2012 | Chen | H04L 5/0053 370/279 |
| 2012/0045014 A1* | 2/2012 | Damnjanovic | H04L 5/001 375/295 |
| 2012/0054258 A1* | 3/2012 | Li | H04W 72/0406 709/201 |
| 2012/0057519 A1* | 3/2012 | Kim | H04B 7/0413 370/315 |
| 2012/0063321 A1 | 3/2012 | Chandrasekhar et al. | |
| 2012/0069802 A1* | 3/2012 | Chen | H04L 5/001 370/329 |
| 2012/0076023 A1* | 3/2012 | Ko | H04B 7/0486 370/252 |
| 2012/0076063 A1* | 3/2012 | Jiang | H04L 5/0035 370/312 |
| 2012/0076221 A1 | 3/2012 | Zhang et al. | |
| 2012/0120924 A1* | 5/2012 | Montojo | H04W 48/12 370/336 |
| 2012/0176884 A1* | 7/2012 | Zhang | H04W 72/042 370/203 |
| 2012/0294204 A1* | 11/2012 | Chen | H04L 5/0053 370/280 |
| 2013/0003569 A1* | 1/2013 | Lindoff | H04L 1/0045 370/252 |
| 2013/0003604 A1* | 1/2013 | Blankenship | H04L 5/0023 370/255 |
| 2013/0003672 A1* | 1/2013 | Dinan | H04L 1/00 370/329 |
| 2013/0010709 A1* | 1/2013 | Earnshaw | H04W 72/0453 370/329 |
| 2013/0010715 A1* | 1/2013 | Dinan | H04W 72/04 370/329 |
| 2013/0039284 A1* | 2/2013 | Marinier | H04L 5/001 370/329 |
| 2013/0176952 A1* | 7/2013 | Shin | H04W 72/042 370/329 |
| 2013/0208604 A1* | 8/2013 | Lee | H04L 25/0226 370/252 |
| 2014/0003385 A1* | 1/2014 | Dinan | H04W 16/02 370/329 |
| 2014/0105165 A1* | 4/2014 | Dinan | H04L 27/2692 370/329 |
| 2014/0140316 A1 | 5/2014 | Nagata et al. | |
| 2014/0153539 A1 | 6/2014 | Seo et al. | |
| 2014/0286184 A1* | 9/2014 | Kim | H04B 7/024 370/252 |
| 2014/0334436 A1* | 11/2014 | Qu | H04L 5/005 370/330 |

FOREIGN PATENT DOCUMENTS

| | | |
|---|---|---|
| CN | 101931599 | 12/2010 |
| CN | 201893787 | 7/2011 |
| EP | 2214341 | 8/2010 |
| EP | 2 733 875 | 5/2014 |
| EP | 2 739 083 | 6/2014 |
| WO | WO 2010/013959 | 2/2010 |
| WO | WO 2011/038405 | 3/2011 |

OTHER PUBLICATIONS

NTT Docomo, "Investigation of Specification Impact for Rel. 11 CoMP", R1-112600, 3GPP TSG RAN WG1 Meeting #66, Aug. 22-26, 2011.

European Search Report dated Apr. 20, 2015 issued in counterpart application No. 12835861.1-1851.

Chinese Office Action dated Jul. 21, 2016 issued in counterpart application No. 201280058683.5, 15 pages.

Panasonic, "DCI forRel-11 CoMP Operations", R1-121155, 3GPP TSG RAN WG1 Meeting #68bis, Mar. 26-30, 2012, 4 pages.

Japanese Office Action dated Oct. 24, 2016 issued in counterpart application No. 2014-533219, 8 pages.

(56) References Cited

OTHER PUBLICATIONS

3rd Generation Partnership Project; Technical Specification Group Radio Access Network; Evolved Universal Terrestrial Radio Access (E-UTRA); Physical Layer Procedures (Release 10), 3GPP TS 36.213 V10.0.0, Dec. 2010, 98 pages.
"Indication of Starting Symbol in PDSCH in a Cross-Scheduled Carrier", R1-102979, 3GPP TSG RAN WG1 #61, May 10-14, 2010, 2 pages.
Japanese Office Action dated Dec. 10, 2018 issued in counterpart application No. 2014-533219, 13 pages.
Japanese Office Action dated Jan. 28, 2019 issued in counterpart application No. 2017-207597, 8 pages.
Samsung, "PDSCH Transmission in MBSFN Subframes", R1-110736, 3GPP TSG RAN WG1 #64, Feb. 21-25, 2011, 4 pages.
Korean Office Action dated Mar. 12, 2020 issued in counterpart application No. 10-2012-0109494, 6 pages.
ZTE, "Discussion on Mapping Between GIF and Cell Index", R2-105339, 3GPP TSG-RAN WG2 Meeting #71 bis, Oct. 11-15, 2010, 5 pages.
Motorola, Further Details on CIF Design, R1-101108, 3GPP TSG RAN WG1 Meeting #60, Feb. 22-26, 2010, 3 pages.
Chinese Office Action dated Nov. 5, 2019 issued in counterpart application No. 201611104715.7, 19 pages.
European Search Report dated Nov. 19, 2019 issued in counterpart application No. 12835861.1-1219, 7 pages.
Korean Office Action dated Sep. 18, 2019 issued in counterpart application No. 10-2012-0109494, 9 pages.

\* cited by examiner

METHOD AND APPARATUS FOR PROVIDING INFORMATION ABOUT AVAILABLE WIRELESS RESOURCES AND DETERMINING THE WIRELESS RESOURCES USED FOR DATA TRANSMISSION

PRIORITY

This application claims priority under 35 U.S.C. § 119 (e) to United States Provisional Applications filed in the United States Patent and Trademark Office on Sep. 30, 2011, Mar. 7, 2012, Mar. 13, 2012, and Aug. 23, 2012, and assigned Ser. Nos. 61/541,417, 61/607,697, 61/610,152, and 61/692,526, respectively, the entire content of each of which is incorporated herein by reference.

BACKGROUND OF THE INVENTION

1. Field of the Invention

The present invention relates generally to a method and apparatus for transmitting and receiving data in a wireless communication system and more particularly to a method and apparatus for providing information about available wireless resources and accurately determining the wireless resources used for data transmission.

2. Description of the Related Art

Mobile communication systems have evolved into high-speed, high-quality wireless packet data communication systems to provide data services and multimedia services as well as the early voice-related services. Recently, a variety of mobile communication standards, such as 3GPP High Speed Downlink Packet Access (HSDPA), 3GPP High Speed Uplink Packet Access (HSUPA), Long Term Evolution (LTE), Long Term Evolution-Advanced (LTE-A), 3GPP2 High Rate Packet Data (HRPD), and IEEE 802.16, have been developed to support high-speed, high-quality wireless packet data transmission services. Specifically, the LTE system, developed to efficiently support high-speed wireless packet data transmission, may maximize the capacity of the wireless system using a variety of wireless access technologies. The LTE-A system, a wireless system evolved from the LTE system, has an improved data transmission capability compared to the LTE system.

The existing $3^{rd}$ Generation (3G) wireless packet data communication systems, such as HSDPA, HSUPA and HRPD, use technologies such as an Adaptive Modulation and Coding (AMC) method and a channel-sensitive scheduling method in order to improve the transmission efficiency. With the use of the AMC method, a transmitter may adjust the amount of its transmission data depending on the channel state. That is, when the channel state is poor, the transmitter may reduce the amount of transmission data to set the receive error probability to a desired level. However, when the channel state is good, the transmitter may increase the amount of transmission data to efficiently transmit a lot of information while setting the receive error probability to the desired level. With the use of the channel-sensitive scheduling method, a transmitter may selectively serve a user having the excellent channel state among a plurality of users, thus contributing to an increase in the system capacity, compared to allocating a channel to one user and serving the user with the allocated channel. This capacity increase is referred to as a multi-user diversity gain. In short, the AMC method and the channel-sensitive scheduling method are methods of receiving feedback such as partial channel state information from a receiver, and applying an appropriate modulation and coding scheme at the time that is determined to be most efficient.

When used together with a Multiple Input Multiple Output (MIMO) transmission scheme, the AMC method may also include a function of determining the number of or ranks of spatial layers for transmission signals. In this case, in determining the optimal data rate, the AMC method considers even the number of layers on which it will transmit data using MIMO, without simply considering only the modulation scheme and coding rate.

Recently, research has been conducted to switch Code Division Multiple Access (CDMA), a multiple access scheme which has been used in the $2^{nd}$ Generation (2G) and $3^{rd}$ Generation (3G) mobile communication systems, to Orthogonal Frequency Division Multiple Access (OFDMA) in the next-generation communication systems. 3GPP and 3GPP2 have begun standardization work on the evolved systems that use OFDMA. It is well known that OFDMA may contribute to the capacity increase, compared to CDMA. One of the several causes contributing to the capacity increase is that OFDMA can perform frequency domain scheduling. As the capacity gain was obtained by the channel-sensitive scheduling method based on the time-varying characteristics of channels, and the capacity gain can be obtained further by utilizing the frequency-dependent characteristics of channels.

Generally, a cellular mobile communication system is accomplished by building a plurality of cells in a limited area. For each cell, enhanced Node B (eNB) equipment in charge of mobile communication in the cell is located at the center of the cell area. The eNB equipment includes an antenna for transmitting wireless signals and a signal processing component, and provides a mobile communication service to UEs in the cell at the center of the cell. Generally, a non-Coordinated Multi-Point transmission/reception (non-CoMP) scheme is used, in which one UE receives data from one eNB.

Conversely, in a CoMP transmission scheme a plurality of eNBs transmit data to one UE, a plurality of transmission points and reception points transmit and receive data in the same frequency domain, providing the enhanced transmission/reception performance to a UE in cooperation with each other. When the CoMP scheme is used, one UE receives signals from a plurality of eNBs, making it possible to provide services having improved data rates to a UE located relatively far from its eNB.

In the CoMP scheme, cells transmitting data to one UE are subject to change depending on scheduling by a centralized controller that controls the cells. Wireless resources used to transmit data in different cells are different from each other. Therefore, during data decoding, a UE needs information about the wireless resources. The UE may not successfully restore or decode data, when it cannot find the information about the wireless resources. Therefore, the conventional wireless communication system, in which the CoMP scheme is used, requires a method of providing information about wireless resources available in each cell to a UE for the UE to accurately determine the wireless resources used for data transmission.

SUMMARY OF THE INVENTION

Accordingly, an aspect of the present invention is to solve at least the above-described problems occurring in the prior art and provide at least the advantages described below. An aspect of the present invention is to provide a method and apparatus for transmitting and receiving data in a wireless communication system.

According to another aspect of the present invention, there is provided a method and apparatus for transmitting information about wireless resources used to transmit data, to a UE using a control channel in a wireless communication system in which a CoMP scheme is used.

According to one aspect of the present invention, there is provided a method for receiving data by a User Equipment (UE) in a wireless communication system using a Coordinated Multi-Point transmission/reception (CoMP) scheme. The method includes receiving Downlink Control Information (DCI) including CoMP control information; determining a starting position of a data channel on wireless resources based on starting position information of a data channel included in the CoMP control information and used in each of a plurality of cells; and receiving data from the plurality of cells starting from the determined starting position.

According to another aspect of the present invention, there is provided a method for transmitting data by an enhanced Node B (eNB) in a wireless communication system using a Coordinated Multi-Point transmission/reception (CoMP) scheme. The method includes generating CoMP control information including starting position information of a data channel used in each of a plurality of cells; transmitting the CoMP control information to a User Equipment (UE) along with Downlink Control Information (DCI); and transmitting data to the UE starting from a starting position of a data channel on wireless resources.

According to a further another aspect of the present invention, there is provided a User Equipment (UE) in a wireless communication system using a Coordinated Multi-Point transmission/reception (CoMP) scheme. The UE includes a reception unit configured to receive Downlink Control Information (DCI) including CoMP control information; and a controller configured to determine a starting position of a data channel on wireless resources based on starting position information of a data channel included in the CoMP control information and used in each of a plurality of cells, and control the reception unit to receive data from the plurality of cells starting from the determined starting position.

According to yet another aspect of the present invention, there is provided an enhanced Node B (eNB) in a wireless communication system using a Coordinated Multi-Point transmission/reception (CoMP) scheme. The eNB includes a transmission unit; and a controller for generating CoMP control information including starting position information of a data channel used in each of a plurality of cells, and controlling the transmission unit to transmit the CoMP control information to a User Equipment (UE) along with Downlink Control Information (DCI) and to transmit data to the UE starting from a starting position of a data channel on wireless resources.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF THE EMBODIMENTS OF THE PRESENT INVENTION

Figure 1:
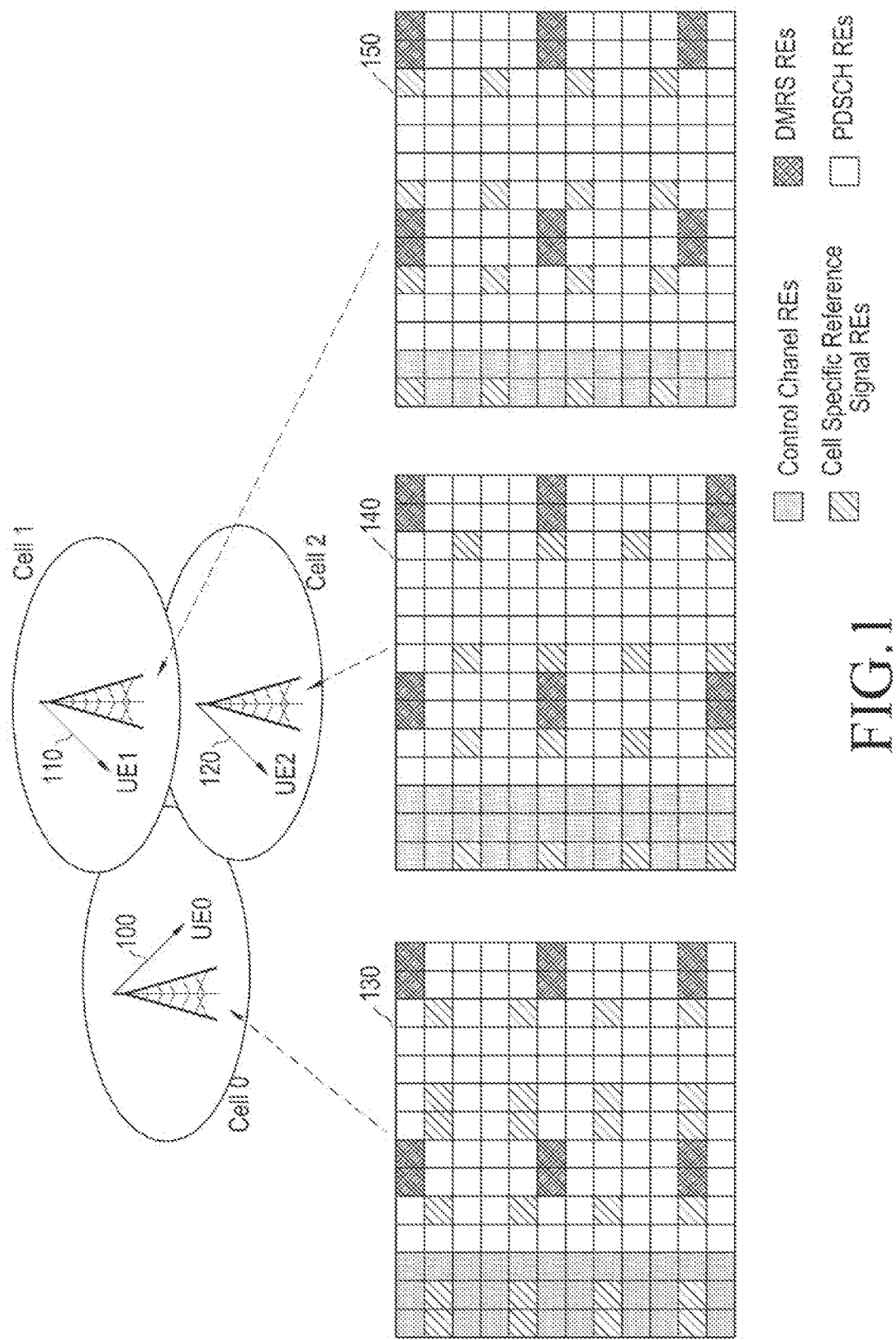
FIG. 1 is a diagram illustrating an example of a mobile communication system in which a non-CoMP transmission scheme is used.

Various embodiments of the present invention are described in detail with reference to the accompanying drawings. In the following description, specific details such as detailed configuration and components are merely provided to assist the overall understanding of the embodiments of the present invention. Therefore, it will be apparent to those skilled in the art that various changes and modifications of the embodiments described herein can be made without departing from the scope and spirit of the invention. In addition, descriptions of well-known functions and components are omitted to avoid obscuring the subject matter of the present invention. Further, the same drawing reference numerals are used to refer to the same elements, features and structures through the drawings.

Although embodiments of the present invention are described in detail with reference to an OFDM wireless communication system, specifically with reference to the 3GPP EUTRA standard, it will be apparent to those of ordinary skill in the art that the subject matter of the present invention may be applied to any other communication systems having similar technical backgrounds and channel formats.

According to an aspect of the present invention, there is provided a method and apparatus for notifying wireless resources used to transmit data signals using a control channel, for efficient management of time and frequency resources, when a Coordinated Multi-Point transmission/ reception (COMP) transmission scheme is used, in which one or more eNBs transmit data to one UE at the same time, in a mobile communication system having a plurality of eNBs.

FIG. 1 is a diagram illustrating an example of a mobile communication system in which a non-CoMP transmission scheme is used.

FIG. 1 is a diagram illustrating an example of a mobile communication system having three cells, and a transmit/ receive antenna is placed at the center of each cell.

In each of a cell 0, a cell 1 and a cell 2 illustrated in FIG. 1 is placed an eNB transmission/reception equipment to transmit data to a UE existing in the cell. That is, an enhanced Node B (eNB) of the cell 0 transmits a data signal 100 to a User Equipment (UE) 0 existing in the service area (or coverage) of the cell 0. At the same time, using the same time and frequency resources as the time and frequency resources used in the cell 0, an eNB of the cell 1 may transmit a data signal 110 to a UE 1 existing in the coverage of the cell 1 and an eNB of the cell 2 may transmit a data signal 120 to a UE 2 in the coverage of the cell 2. Regarding wireless resources 130 used in the cell 0, wireless resources 140 used in the cell 2 and wireless resources 150 used in the cell 1, the cell 0 to the cell 2 transmit their data signals using the same time and frequency resources. Transmission in each of the cell 0, the cell 1 and the cell 2 is performed using the non-CoMP transmission scheme, and wireless resources of each cell are used only for a UE in the cell.

In FIG. 1, a UE receiving a signal from each cell may know in advance which frequency or time resources are available in the signals that an eNB of the cell transmits. For example, a UE, which has received a signal transmitted from the cell 0, may determine to which position in the signal transmitted by an eNB of the cell 0 a Cell-specific Reference Signal (CRS) is transmitted and how many OFDM symbols are transmitted over a control channel, before the UE receives a data channel or a Physical Downlink Shared CHannel (PDSCH). It is possible to know that the signals transmitted from eNBs of the cell 0, the cell 1 and the cell 2 comprise different parts which can be used as a PDSCH. The UEs in FIG. 1 receive signals always from their fixed cells when receiving non-CoMP signals. That is, a UE receiving a signal from the cell 0 receives signals only from its fixed cell 0 unless its handover to another cell is performed based on separate higher layer signaling.

Downlink transmission in the mobile communication system illustrated in FIG. 1 is divided into a control region and a data region in a time domain. The control region is used to transmit control channels such as a Physical Downlink Control CHannel (PDCCH), a Physical HARQ Indicator CHannel (PHICH), and a Physical Control Format Indicator CHannel (PCFICH), and corresponds to one, two, three and four OFDM symbols which are transmitted first within one subframe. Alternatively, the data region starts at an OFDM symbol next to the control region and is used to transmit a PDSCH for data information. Because one subframe includes a fixed number of OFDM symbols, the size of the data region is determined depending on the size of the control region. Generally, in a mobile communication system, a UE may determine a size of a control channel based on control information carried on a PCFICH, and then determine a size of the data region depending on the determined size of the control channel.

As described above with reference to FIG. 1, the non-CoMP transmission scheme performs transmission and reception without any cooperation between eNBs of cells. A CoMP transmission scheme for performing transmission and reception with cooperation between eNBs of cells is described below with reference to FIG. 2.

Figure 2:
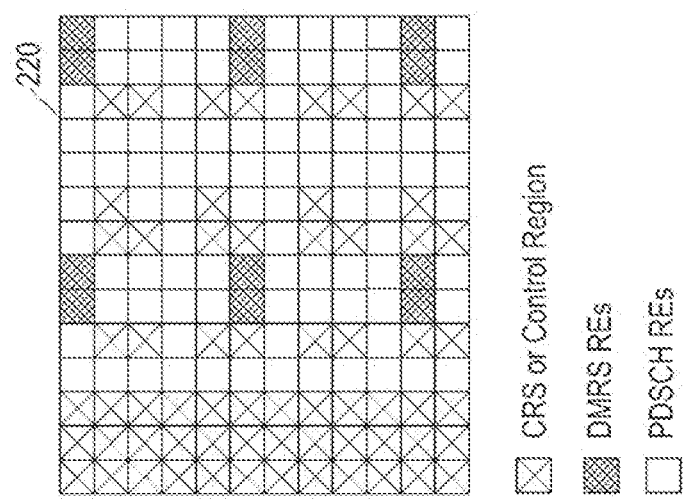
FIG. 2 is a diagram illustrating an example of a mobile communication system in which a CoMP transmission scheme is used.
Figure 2:
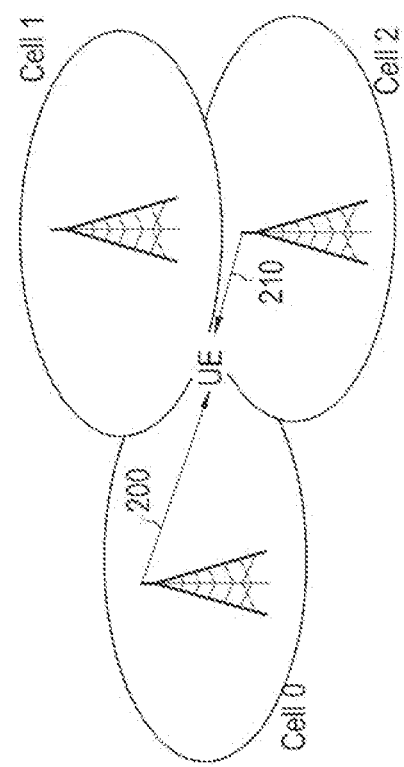

FIG. 2 is a diagram illustrating an example of a mobile communication system in which a CoMP transmission scheme is used.

Referring to FIG. 2, a UE receives a PDSCH from a cell 0 and a cell 2. In FIG. 2, unlike in FIG. 1, the UE receives signals 200 and 210 which are simultaneously transmitted from two cells. When the UE receives the signals 200 and 210 which are simultaneously transmitted from two cells in this way, a PDSCH is transmitted considering a CRS and a control region which are transmitted from each cell. For example, in FIG. 2, the UE receives a PDSCH in the remaining parts except for wireless resources for a CRS and a control region of the cell 0 and wireless resources for a CRS and a control region of the cell 2.

The wireless resources 220 that the UE uses to receive a PDSCH when receiving the signals 200 and 210 which are transmitted from two cells, are configured in the combined form of, for example, the wireless resources 130 used in the cell 0 and the wireless resources 140 used in the cell 2 illustrated in FIG. 1.

When the UE receives signals from a plurality of cells, the wireless resources used to transmit a PDSCH are subject to change depending on how a control region and a CRS of each cell are set. Even when a Dynamic Point Selection (DPS) scheme is used that can change cells that transmit data on a subframe basis, wireless resources used to transmit a PDSCH are subject to change. In the case of the DPS-based CoMP transmission, the network determines which cell will transmit a PDSCH to a UE, in terms of optimizing the system performance.

Figure 3:
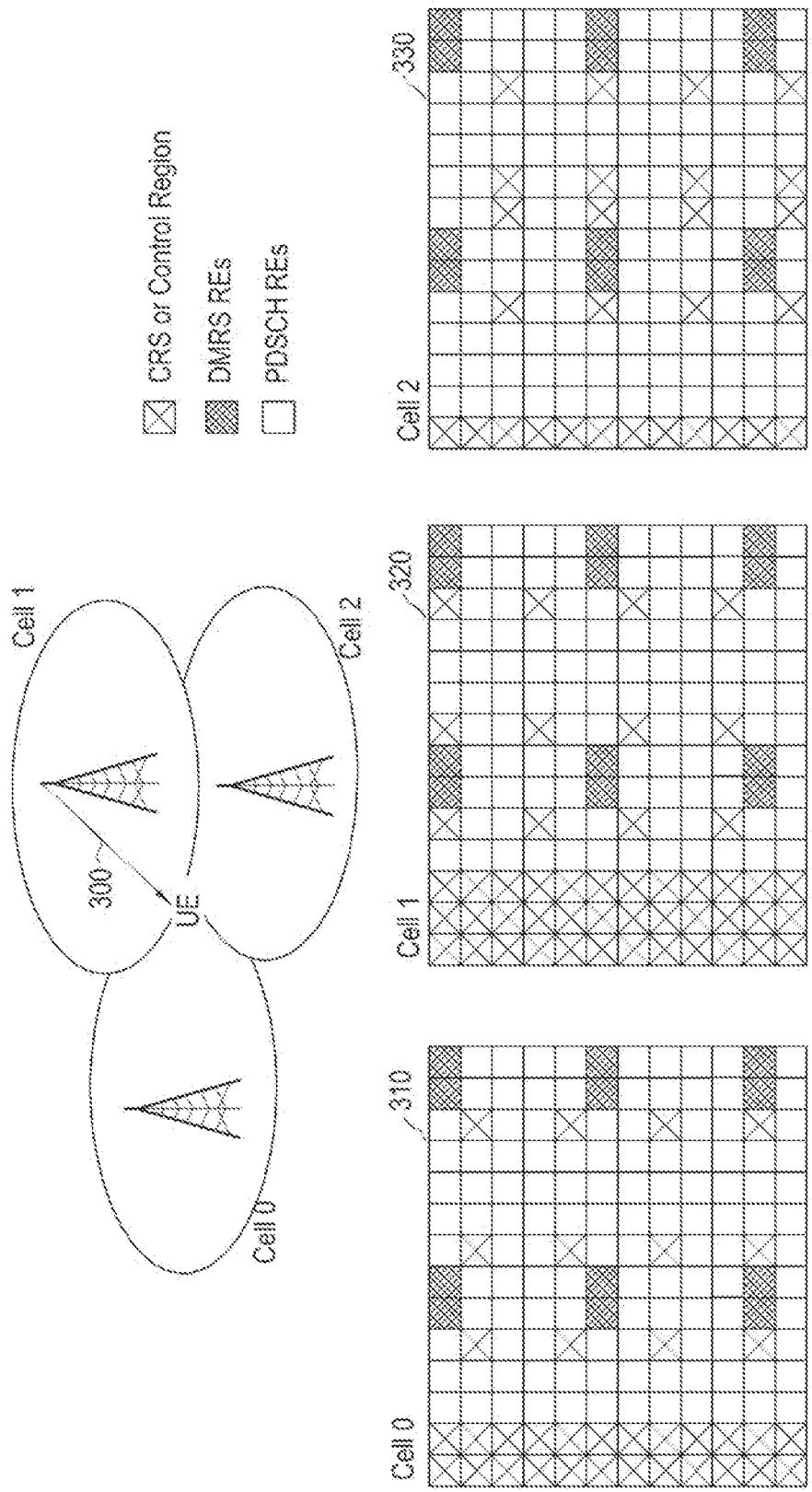
FIG. 3 is a diagram illustrating wireless resources that a UE can use for PDSCH reception when a DPS scheme is used.

FIG. 3 is a diagram illustrating wireless resources that a UE can use for PDSCH reception when a DPS scheme is used.

Referring to FIG. 3, a UE may receive a PDSCH from any one of a cell 0, a cell 1 and a cell 2. Therefore, the wireless resources that the UE can use to receive a PDSCH signal are subject to change depending on from which cell the PDSCH signal is transmitted. The wireless resources that the UE can use to receive a PDSCH signal are determined based on the position of an OFDM symbol where the PDSCH starts, and the number of and positions of CRSs.

For example, when the cell 1 transmits a PDSCH signal 300 to the UE as illustrated in FIG. 3, the UE needs to use wireless resources 320 corresponding to the cell 1 to receive the PDSCH signal. Conversely, when the cell 0 transmits a PDSCH signal to the UE, the UE needs to use wireless resources 310 corresponding to the cell 0 to receive the PDSCH signal, and when the cell 2 transmits a PDSCH signal to the UE, the UE needs to use wireless resources 330 corresponding to the cell 2 to receive the PDSCH signal. Alternatively, in a mobile communication system in which the CoMP scheme is not used, these considerations are not applied, because a UE receives a PDSCH signal always from the same cell.

Generally, in a downlink, in order to restore or decode data by receiving a PDSCH signal, a UE should accurately know the wireless resources used to transmit the PDSCH signal. The UE may not successfully restore the data included in the PDSCH signal when the UE does not know which frequency and time resources were used to transmit the PDSCH signal. Therefore, the UE that receives CoMP transmission signals as in FIGS. 2 and 3, needs to accurately determine the wireless resources available in each cell, and based thereon, to determine the wireless resources on which a PDSCH can be transmitted.

Although FIG. 3 illustrates a case where CoMP transmission is performed in the same frequency band, the same is applied to a case where Carrier Aggregation (CA) is used that transmits data to a UE using a plurality of frequency bands. When CA is used in a mobile communication system, the network transmits a Carrier Indicator Field (CIF) to a UE using a PDCCH. The CIF information is 3 bits, and indicates which of five carriers the UE will receive. Table 1 shows the information that the CIF provides to a UE.

TABLE 1

| CIF (3 Bits) | Carrier Indication | PDSCH Starting Position |
| --- | --- | --- |
| 000 | Carrier A | Monitor PCFICH |
| 001 | Carrier B | Higher layer signaling configures fixed value |
| 010 | Carrier C | Higher layer signaling configures fixed value |
| 011 | Carrier D | Higher layer signaling configures fixed value |
| 100 | Carrier E | Higher layer signaling configures fixed value |
| other | Reserved | Reserved |

In Table 1, when the CIF is '000,' the UE determines that it should receive a PDSCH on a primary carrier. When receiving a PDSCH on the primary carrier, the UE determines an OFDM symbol where the PDSCH starts, based on the value indicated by a PCFICH in the primary carrier. That is, when the CIF is '000,' the UE receives a PDSCH on the primary carrier 'Carrier A,' and when the PCFICH indicates a size of a control region as 'n,' the UE receives the PDSCH starting from an (n+1)-th OFDM symbol.

Alternatively, when the CIF is '001,' '010,' '011' and '100,' the UE determines that a PDSCH is received on 'Carrier B,' 'Carrier C,' 'Carrier D' and 'Carrier E,' respectively, and assumes that an OFDM symbol where the PDSCH starts, is a value that is set in advance by higher layer signaling. The CIF is transmitted only when the UE uses CA. That is, no CIF is transmitted to the UE, when the UE may receive data always in one frequency band.

In a mobile communication system where the CoMP scheme is used, the optimal combination for actual downlink communication is subject to change instantaneously depending on the state of traffic and wireless channels. For example, in the case of a mobile communication system where scheduling is performed every 1 millisecond (msec), like the LTE-A system, cells for the CoMP scheme are subject to change on a 1-msec basis.

Generally, when the CoMP scheme is used, the network sets a set (hereinafter referred to as a 'CoMP set') of cells that can transmit their signals to a UE, for each UE. A different CoMP set is set for each UE depending on the position of each UE. For example, FIG. 2 corresponds to a scenario in which the CoMP set is set as {Cell 0, Cell 1, Cell 2} and the UE receives transmission signals from the cell 0 and the cell 2.

FIG. 3 is a diagram illustrating one of the transmission methods available, where the CoMP set is set as {Cell 0, Cell 1, Cell 2}. In FIG. 3, wireless resources for a PDSCH are subject to change depending on from which cell the PDSCH is transmitted. This is because the wireless resources 310 used in the cell 0 for PDSCH transmission, the wireless resources 320 used in the cell 1 for PDSCH transmission, and the wireless resources 330 used in the cell 2 for PDSCH transmission are different from one another.

The CoMP transmission scheme in FIG. 3, unlike the non-CoMP transmission scheme in FIG. 1, allows a UE to receive a PDSCH from any one of the cell 0, the cell 1 and the cell 2 without handover by higher layer signaling. Generally, in a system where the CoMP transmission scheme is not supported, in order for a UE to receive a PDSCH from another cell while receiving the PDSCH from one cell, a handover process accompanying higher layer signaling is performed. However, the handover process takes time and is prone to failure.

Alternatively, in a system to which the CoMP transmission scheme is applied, while receiving a signal from any one of the cell 0, the cell 1 and the cell 2, a UE may receive a signal from another one of the cell 0, the cell 1 and the cell 2 without handover accompanying higher layer signaling, because in a system where the CoMP transmission scheme is supported, there is a centralized controller for controlling transmission/reception of a plurality of cells.

In FIG. 3, when a UE receives a signal from another cell without higher layer signaling while receiving a signal from one cell, the UE may not know in advance from which cell a PDSCH is transmitted. Even though wireless resources that can be used in each cell to transmit a PDSCH are different as illustrated by reference numerals 130, 140 and 150 in FIG. 1, a UE may not receive in advance information about the different wireless resources. Therefore, whenever an eNB transmits a PDSCH to a UE, a separate control channel is needed that indicates which wireless resources the PDSCH uses. The separate control channel includes a control channel such as a Physical Downlink Control CHannel (PDCCH) or an Enhanced Physical Downlink Control CHannel (E-PDCCH), as defined in LTE-A.

Figure 4:
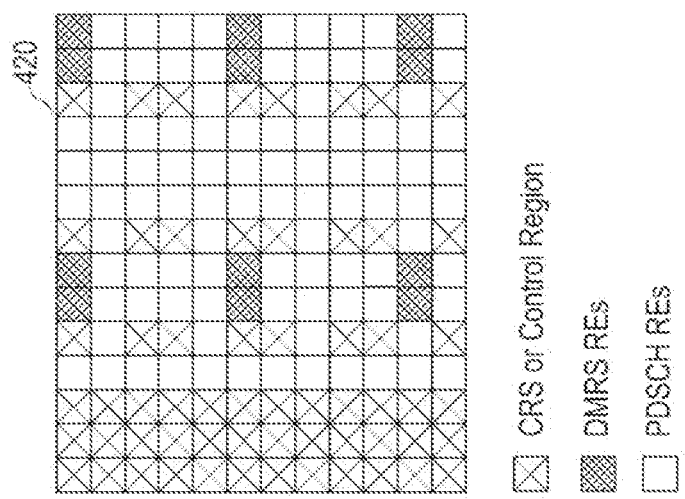
FIG. 4 is a diagram illustrating an example of a transmission scheme that can be used when a CoMP set is set.
Figure 4:
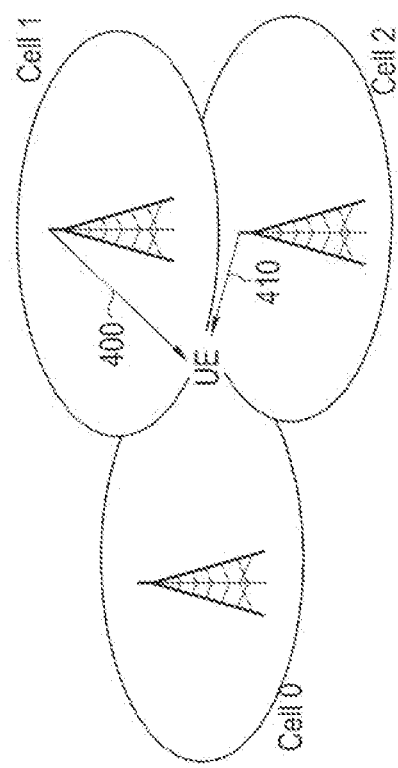

FIG. 4 is a diagram illustrating an example of a transmission scheme used when a CoMP set is set.

Referring to FIG. 4, when a CoMP set is set as {Cell 0, Cell 1, Cell 2}, a UE receives signals 400 and 410 from the cell 1 and the cell 2, respectively. That is, the UE receives a PDSCH signal from two cells. The wireless resources, used by the cell 1 and the cell 2 to transmit a PDSCH, are illustrated by reference numeral 420.

In FIG. 4, like in FIG. 3, the cells that simultaneously transmit signals to a UE are not fixed and are subject to change depending on the scheduling by the centralized controller. For example, while a PDSCH is transmitted from the cell 1 and the cell 2 as illustrated in FIG. 4, a PDSCH is transmitted from the cell 2 and the cell 0 in the next transmission depending on the determination of the centralized controller. This process, in which transmission cells are changed, is performed without a handover process companying with separate higher layer signaling, as in FIG. 3. In FIG. 4, like in FIG. 3, the wireless resources, on which a PDSCH signal is transmitted, may vary depending on which two cells transmit signals to the UE. Therefore, there is a need to notify the UE which wireless resources are used to transmit a PDSCH, using a control channel such as a PDCCH, as described above.

Figure 5:
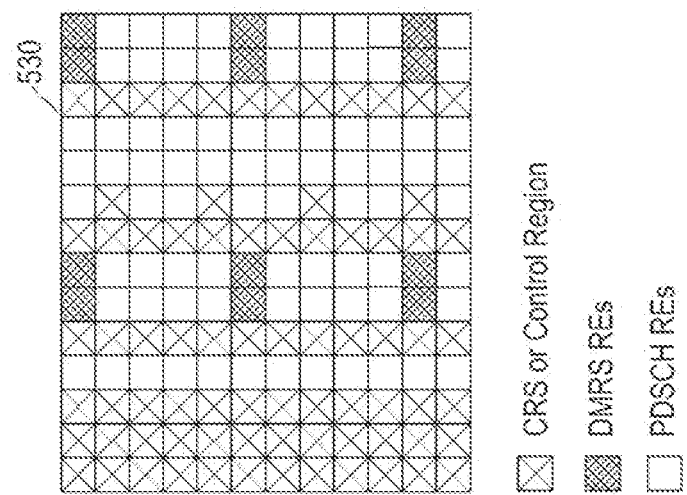
FIG. 5 is a diagram illustrating another example of a transmission scheme that can be used when a CoMP set is set.
Figure 5:
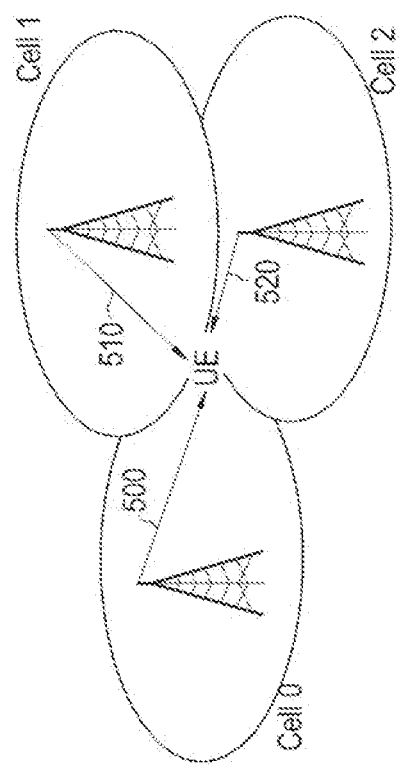

FIG. 5 is a diagram illustrating another example of a transmission scheme that can be used when a CoMP set is set.

Referring to FIG. 5, when a CoMP set is set as {Cell 0, Cell 1, Cell 2}, a UE receives signals 500, 510 and 520 from the cell 0, the cell 1 and the cell 2, respectively. That is, the UE receives a PDSCH signal from all cells in the CoMP set. Wireless resources used by the cell 0, the cell 1 and the cell 2 to transmit a PDSCH are as illustrated by reference numeral 530.

The transmission schemes illustrated in FIGS. 3, 4 and 5 are performed under control of the centralized controller. That is, when the centralized controller determines to transmit a signal to a UE from one cell, the PDSCH transmission illustrated in FIG. 3 is performed. Alternatively, when the centralized controller determines to transmit signals to a UE from all cells, the PDSCH transmission illustrated in FIG. 5 is performed. Consequently, which cell transmits a signal to a UE and how many cells transmit signals to the UE depends on the determination of the centralized controller.

According to an embodiment of the present invention, there is provided a method of transmitting, to a UE, information indicating which PDSCH transmission is made to the UE on which wireless resource, when a CoMP transmission scheme is used in which various combinations of cells are possible as in FIGS. 3, 4 and 5.

In order for a UE to accurately determine which wireless resources were used to transmit a PDSCH, CRS configuration information (hereinafter CRS configuration) and size information of a control region are needed.

According to an aspect of the present invention, the procedure for determining which wireless resources are used to transmit a PDSCH, is performed as follows. First, the centralized controller sets a CoMP set of a UE. The CoMP set of a UE is determined based on the location of the UE, available eNBs, traffic state of the wireless communication system, etc. Once the CoMP set is determined, the centralized controller transmits the following three types information to the UE based on higher layer signaling in order to determine the wireless resources that cannot be used as PDSCH, for each cell. The first type of information is CRS information (the number of CRS antenna ports (hereinafter referred to as 'CRS antenna port count'), and CRS frequency domain offset). The second type of information is Multicast Broadcast Single Frequency Network (MBSFN) subframe information (information indicating which subframe is an MBSFN subframe. The third type of information is PDSCH starting OFDM symbol information. Among the three types of information, the first type of information is needed to accurately determine a position of a CRS that is transmitted for each cell. A CRS for each cell is determined depending on the number of antenna ports for the CRS and the information indicating by which offset value the CRS is set in a frequency domain. An offset value in the frequency domain is determined by a parameter v_shift that has an integer of 0 to 5, for example, in the LTE/LTE-A system.

The second type of information is information for determining at which antenna a CRS is transmitted. In the LTE-A system, downlink transmission is performed every 1 msec and referred to as a subframe. Further, in the LTE-A system, a special subframe, called an MBSFN subframe, is set and in that subframe, no CRS is transmitted starting from the third OFDM symbol. Each cell is set such that an MBSFN subframe is periodically transmitted, and this information is included in the second type of information.

The third type of information is information for determining an OFDM symbol, starting from which the UE receives a PDSCH. Generally, when the CoMP scheme is not supported, a UE receives a PDSCH only from one cell, and determines a PDSCH starting OFDM symbol depending on a PCFICH for the cell. However, when the CoMP scheme is supported, a UE may receive a PDSCH from a different cell at a different time depending on the determination of the network. Consequently, determining a PDSCH starting OFDM symbol depending on a PCFICH for a specific cell by the UE causes a malfunction and degrades system performance.

A unique subframe-based time offset value is set for each cell. Specifically, in order to determine wireless resources of a specific subframe, a UE needs to know when an MBSFN subframe for each of the cells occurs, and the third type of information includes information for determining when an MBSFN subframe occurs. According to an embodiment of the present invention, all of the three types of information—the first type of information, the second type of information and the third type of information—are transmitted to the UE. Otherwise, only some of the three types of information are transmitted to the UE.

After the first type of information, the second type of information and the third type of information are transmitted to the UE by higher layer signaling, information indicating by how many cells the CoMP transmission is performed and in which cell the CoMP transmission is performed, is transmitted to the UE. In this case, the UE may determine which wireless resources are used for transmission of a PDSCH.

According to an embodiment of the present invention, two bits are used to inform the UE which Resource Elements (REs) are used for CRS, and to transmit, to the UE, position information of an OFDM symbol on which a PDSCH is transmitted. Specifically, information shown in Table 2 below is transmitted to the UE.

TABLE 2

| State | CRS REs | MBSFN Subframe Configuration | PDSCH Starting Position |
| --- | --- | --- | --- |
| 0 | CRS REs for CRS configuration A | MBSFN configuration A | Monitor PCFICH |
| 1 | CRS REs for CRS configuration B | MBSFN configuration B | Configured by higher layer signaling |
| 2 | CRS REs for CRS configuration C | MBSFN configuration C | Configured by higher layer signaling |
| 3 | Reserved | Reserved | Reserved |

The network, as shown in Table 2, may set in advance different CRS configurations and PDSCH starting positions for four states which can be represented by two bits, by higher layer signaling. In addition, the network transmits the 2-bit information for the four states to the UE over a PDCCH or an E-PDCCH, thereby allowing the UE to determine with which wireless resources the UE will receive a PDSCH.

In Table 2, CRS configuration includes information indicating how many antenna ports the CRS includes, and which v_shift vale the CRS has. Further, MBSFN configuration includes information indicating which subframe is an MBSFN subframe.

The method provided by an embodiment of the present invention for determining a PDSCH starting position, includes the following three methods, for allowing a UE to determine a PDSCH starting position, and information related to CRS configuration is assumed to be transmitted to the UE in a separate method.

A first PDSCH starting position determining method is a method in which the network transmits information configured to determine a PDSCH starting position, to the UE using a PDCCH/E-PDCCH. Table 3 below shows a message including information about a PDSCH starting position sent to the UE.

TABLE 3

| State | PDSCH Starting Position |
|---|---|
| 0 | Starting point for PDSCH is OFDM symbol 1 (note that index starts from 0) |
| 1 | Starting point for PDSCH is OFDM symbol 2 (note that index starts from 0) |
| 2 | Starting point for PDSCH is OFDM symbol 3 (note that index starts from 0) |
| 3 | Starting point for PDSCH is OFDM symbol 4 (note that index starts from 0) |

Because the information about a PDSCH starting position, shown in Table 3, includes four states, the information about a PDSCH starting position is transmitted to a UE in two bits.

A second PDSCH starting position determining method is another method in which the network transmits information configured to determine a PDSCH starting position, to the UE using a PDCCH/E-PDCCH. Table 4 below shows a message including information about a PDSCH starting position sent to the UE.

TABLE 4

| State | PDSCH Starting Position |
|---|---|
| 0 | Monitor PCFICH |
| 1 | Configured by higher layer signaling |

Because the information about a PDSCH starting position, shown in Table 4, includes two states, the information about a PDSCH starting position is transmitted to a UE in one bit. For example, if a state 0 is transmitted, the UE determines a PDSCH starting position depending on a PCFICH that the UE receives. That is, if the PCFICH indicates a size of a control region as 'n,' the UE receives a PDSCH starting from an (n+1)-th OFDM symbol. Alternatively, if a state 1 is transmitted, the UE determines a value (or a constant value agreed between the UE and the network) set in advance by higher layer signaling, as a PDSCH starting position.

A third PDSCH starting position determining method is a method in which the network determines a PDSCH starting position based on Channel Status Information-Reference Signal (CSI-RS) configuration of a CoMP measurement set which is set to a UE. The CoMP measurement set represents a set of CSI-RSs that the UE should measure to support a cooperative transmission/reception operation of the network. The UE transfers wireless channel information for a plurality of CSI-RSs to the network, allowing the network to perform cooperative transmission/reception.

In order to set this CoMP measurement set, the network informs the UE which cell ID the UE will use for each CSI-RS. The cell ID is used to generate a scrambling sequence for scrambling that the UE performs for each CSI-RS. In a wireless communication system, in order to generate a scrambling sequence, an initial state value of the scrambling sequence is needed, and this value is determined based on the cell ID.

The UE may determine a PDSCH starting position considering a cell ID that is set for each CSI-RS. That is, if cell IDs individually set for CSI-RSs are all the same as the physical cell ID value of a serving cell, the UE determines a PDSCH starting position depending on the PCFICH that the UE receives. Alternatively, if at least one of the cell IDs individually set for CSI-RSs is different from the physical cell ID of the serving cell, the UE determines a value that is set in advance using higher layer signaling, as a PDSCH starting position.

The reason for determining a PDSCH starting position based on the cell ID that is set for each CSI-RS is because when all cell IDs are the same as the physical cell ID of the serving cell, indicates a distributed antenna system that operates within one cell and, in the distributed antenna system that operates within one cell, a UE may determine a PDSCH starting position using a PCFICH.

The third PDSCH starting position determining method is advantageous in that separate control information does not need to be transferred to a UE using a PDCCH or an E-PDCCH. However, the third PDSCH starting position determining method allows to determine a PDSCH starting position using a PDCCH or an E-PDCCH. That is, by transmitting information configured to determine a PDSCH starting position along with Downlink Control Information (DCI), the third PDSCH starting position determining method allows the UE to determine a PDSCH starting position, as described in detail below, with reference to FIG. 6.

Figure 6:
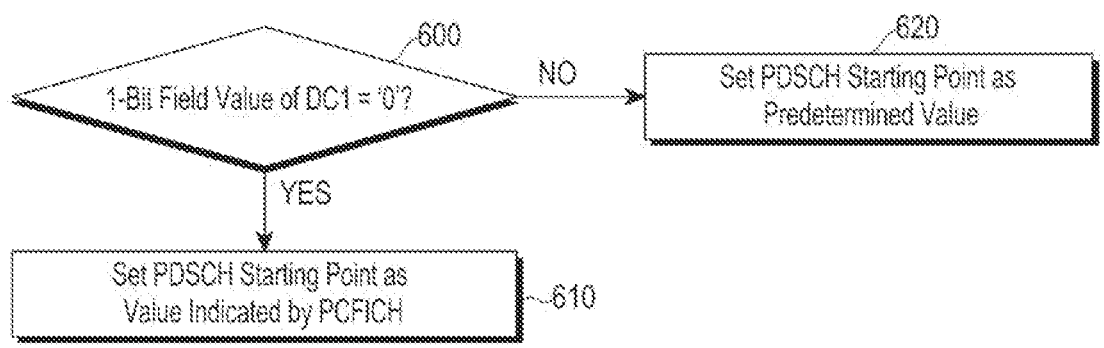
FIG. 6 is a diagram illustrating a method of determining a PDSCH starting position using a PDCCH or an E-PDCCH according to an embodiment of the present invention.

FIG. 6 is a diagram illustrating a method of determining a PDSCH starting position using a PDCCH or an E-PDCCH according to an embodiment of the present invention.

In Step 600, upon receiving DCI, a UE determines if a 1-bit field value included in the received DCI is '0'. If the 1-bit field value included in the received DCI is '0,' the UE sets a PDSCH starting position as a value indicated by a PCFICH in Step 610. The value indicated by a PCFICH includes a value for indicating a control region for the UE to decode a PDCCH, or may include a value for indicating a starting point of a data region for the UE to decode a PDSCH.

However, if the 1-bit field value included in the received DCI is a value (e.g., '1') other than '0,' the UE may set a PDSCH starting position as a predetermined value in Step 620.

The method described above provides information about a PDSCH starting position without large overhead, because only the 1-bit value of DCI is used.

A PDSCH starting position determining method during simultaneous operation of CA and CoMP is as follows. CA and CoMP are simultaneously operated and a UE receives signals in one or more frequency bands, and in each frequency band, a plurality of transmission points perform cooperative transmission/reception. If CA and CoMP are simultaneously operated in this way, the UE simultaneously receives the CIF defined in Table 1 and the control information for CoMP using a PDCCH or an E-PDCCH.

Figure 7:
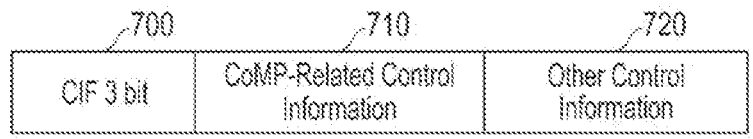
FIG. 7 is a diagram illustrating CIF and control information for CoMP according to an embodiment of the present invention.

FIG. 7 is a diagram illustrating CIF and control information for CoMP according to an embodiment of the present invention.

Referring to FIG. 7, CoMP control information includes the information about a PDSCH starting position defined in Table 1, Table 2 and Table 3, i.e., includes 3-bit CIF 700, CoMP control information 710, and other control information 720. If CIF for CA and control information for CoMP are simultaneously transmitted to a UE in this way, how the UE determines a PDSCH starting position using the two types of information is an important issue. The two types of information both include information related to a PDSCH starting position. Thus, determining, by the UE, a PDSCH starting position using the CIF may be different from determining a PDSCH starting position based on the CoMP control information. Thus, there is a need to notify the UE which of the two PDSCH starting positions has a higher priority.

According to an embodiment of the present invention, priority information is included in CoMP control information. That is, a UE determines a PDSCH starting position considering the priority included in the CoMP control information. Table 5 below shows information configured to determine a PDSCH starting position by receiving CIF and CoMP control information based on priority.

TABLE 5

| State | PDSCH Starting Position |
| --- | --- |
| 0 | If CIF is present, starting position is determined by CIF. Otherwise, starting position is determined by PCFICH. |
| 1 | Configured by higher layer signaling. |
| 2 | Configured by higher layer signaling. |
| 3 | Reserved. |

When the information shown in Table 5 is used, the UE receives 2-bit CoMP control information over a PDCCH or an E-PDCCH. The 2-bit CoMP control information is used to notify the UE of any one of the four states shown in Table 5. When the first state is notified, the UE performs the following operations depending on whether CIF is present or not. If CIF is present, the UE considers a PDSCH starting position designated by the CIF shown in Table 1. If CIF is not present, the UE considers a PDSCH starting position depending on the value notified in a PCFICH.

Although it is assumed that in the case of state 0, the UE determines a PDSCH starting position depending on the PCFICH, the UE may determine a PDSCH starting position not depending on the PCFICH, but depending on a value set by higher layer signaling. If a state other than the state 0 is notified to the UE, the UE determines a PDSCH starting position depending on the value that is set in advance by higher layer signaling as shown in Table 5.

Table 5 is used when CoMP control information notifies only the PDSCH starting position and even when CoMP control information notifies the UE of information about MBSFN subframe configuration and CRS configuration other than the PDSCH starting position.

Table 6 below shows CoMP control information including information about MBSFN subframe configuration and CRS configuration other than the PDSCH starting position according to an embodiment of the present invention.

TABLE 6

| State | CRS REs | MBSFN Subframe Configuration | PDSCH Starting Position |
| --- | --- | --- | --- |
| 0 | If CIF is present, CRS REs is determined by CIF. Otherwise, CRS REs for CRS configuration A. | If CIF is present, MBSFN configuration is determined by CIF. Otherwise, MBSFN configuration A. | If CIF is present, starting position is determined by CIF. Otherwise, starting position is determined by PCFICH. |
| 1 | CRS REs for CRS configuration B | MBSFN configuration B | Configured by higher layer signaling |
| 2 | CRS REs for CRS configuration C | MBSFN configuration C | Configured by higher layer signaling |
| 3 | Reserved | Reserved | Reserved |

Figure 8:
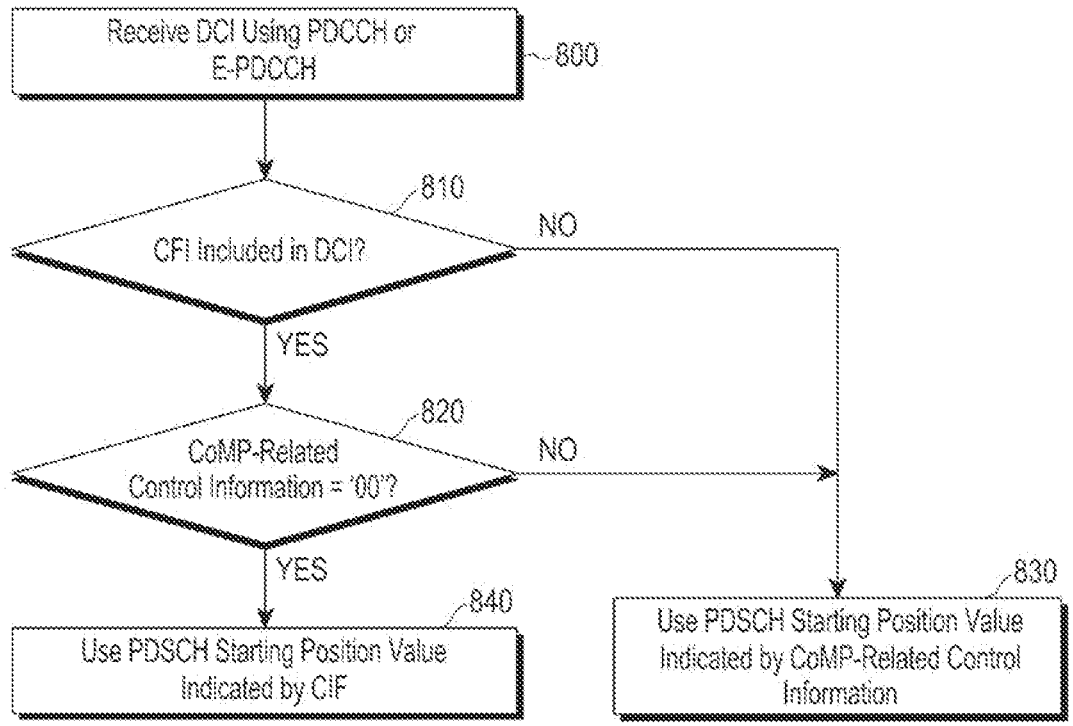
FIG. 8 is a diagram illustrating a method of notifying a UE of a PDSCH's starting point according to an embodiment of the present invention.

FIG. 8 is a diagram illustrating a method of notifying a UE of a PDSCH's starting point according to an embodiment of the present invention.

Referring to FIG. 8, the UE receives DCI using a PDCCH or an E-PDCCH in Step 800. The UE determines in Step 810 whether CFI is included in the DCI. If no CFI is included in the DCI, the UE uses a PDSCH starting position indicated by CoMP control information in Step 830. The PDSCH starting position indicated by CoMP control information is as shown in Table 5 or Table 6.

However, if CIF is included in the DCI, the UE operates differently depending on which state the CoMP control information indicates. Therefore, if CIF is included in the DCI, the UE determines in Step 820 whether CoMP control information is '00'.

If CoMP control information is '00,' the UE uses a PDSCH starting position indicated by CIF in Step 840. The PDSCH starting position indicated by CIF is as shown in Table 1. If CoMP control information is not '00,' the UE uses a PDSCH starting position indicated by CoMP control information in Step 830.

A PDSCH Starting Position Determining Method during Reception of Paging or System Information PDSCH is described below. In a conventional cellular mobile communication system, a UE should be able to receive data related to paging and system information. The paging and the system information are information that not only new UEs supporting a CoMP operation but also UEs produced based on the conventional standard must receive. For the data signal that the UEs produced based on the conventional standard and the UEs produced based on the new standard must simultaneously receive, its transmission scheme is performed to match with that of the conventional UEs. That is, even though a new transmission scheme has been introduced in the new standard, this transmission scheme is not applied during transmission of paging or system information. Instead, the transmission scheme defined in the conventional standard may be used.

The UE supporting a CoMP operation may consider a PDSCH starting position based on the new standard according to the present invention. However, the UE may not apply this PDSCH starting position determining method during reception of paging or system information. When receiving the paging or system information, the UE should apply a PDSCH starting position based on the conventional standard.

According to an embodiment of the present invention, there is provided a method in which a UE differently applies a PDSCH starting position depending on whether paging or system information is received.

Figure 9:
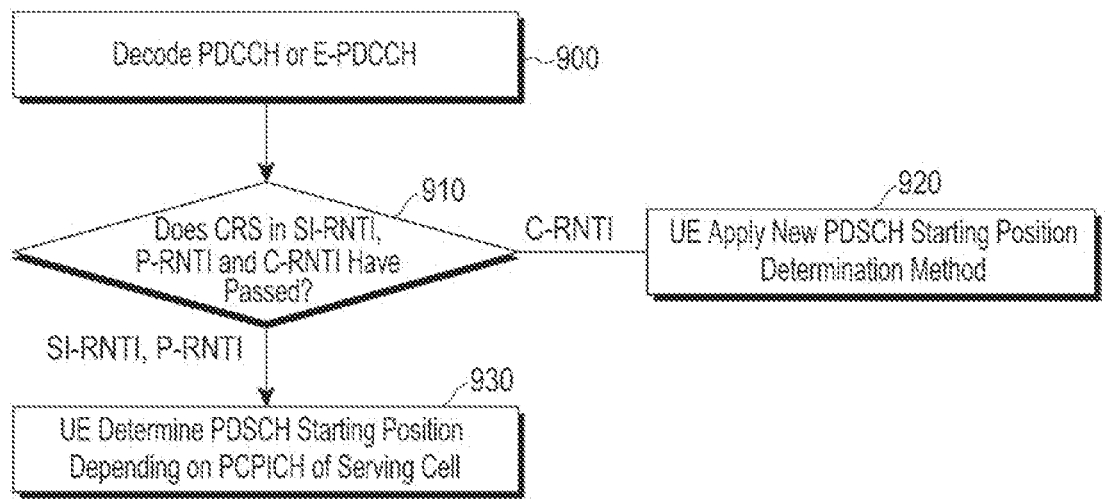
FIG. 9 is a diagram illustrating a method of applying by a UE a PDSCH starting position differently depending on whether the UE has received a paging message or a system information message, according to an embodiment of the present invention.

FIG. 9 is a diagram illustrating a method of applying by a UE a PDSCH starting position differently depending on whether the UE has received a paging message or a system information message, according to an embodiment of the present invention.

Referring to FIG. 9, the UE decodes a channel to receive DCI transmitted over a PDCCH or an E-PDCCH in Step 900. The UE uses Cyclic Redundancy Check (CRC) to determine whether an error exists in decoding results. The CRC, coded symbols transmitted together with the DCI, is used to determine whether the DCI is decoded without error. In a wireless communication system, an eNB scrambles CRC with a Radio Network Temporary Identifier (RNTI) of a UE, when transmitting the CRC to the UE. This RNTI is subject to change depending on the type of a PDSCH notified by a PDCCH/E-PDCCH, as follows. For a PDSCH carrying a paging message to a UE: Paging RNTI (P-RNTI). For a PDSCH carrying a system information message to a UE: System Information RNTI (SI-RNTI). For a PDSCH carrying a UE-specific data signal to a UE: Cell RNTI (C-RNTI).

In order to determine the presence or absence of an error after decoding a PDCCH/E-PDCCH, the UE descrambles CRC with P-RNTI, SI-RNTI and C-RNTI, and determines the presence or absence of an error based thereon. If the RNTI type which is different from the RNTI type that an eNB used during transmission of CRC is used for the descrambling, it is determined that an error occurred. However, if the same RNTI is used for the descrambling, it is determined that there is no error.

In order to use these characteristics, the UE determines in Step 910 whether an error occurs, using CRC for the received DCI. If it is determined in Step 910 that there is no error when C-RNTI-based descrambling is applied, then the UE uses the PDSCH starting position determining methods (e.g., Table 2, Table 3, Table 4, Table 5 and Table 6) according to an embodiment of the present invention, in Step 920.

However, if it is determined in Step 910 that there is no error when PI-RNTI or SI-RNTI-based descrambling is applied, then the UE uses the normal PDSCH starting position determining method in Step 930. The term 'normal PDSCH starting position determining method' as used herein may refer to a method of determining a PDSCH starting position depending on the value indicated by a PCFICH of the serving cell, regardless of the value indicated by CoMP control information. That is, if the PCFICH indicates that a size of a control region is 2, the UE considers that a PDSCH starting position starts from the third OFDM symbol.

Figure 10:
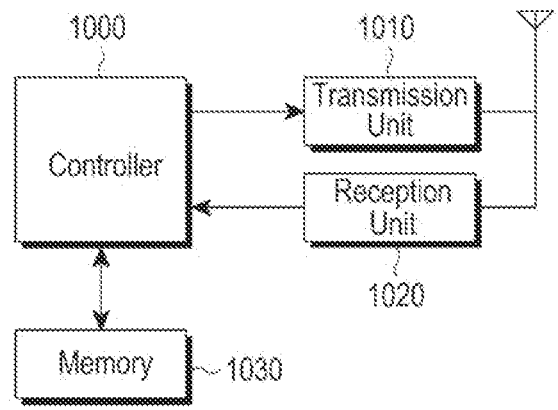
FIG. 10 is a diagram illustrating an internal structure of an eNB according to an embodiment of the present invention.

FIG. 10 is a diagram illustrating an internal structure of an eNB according to an embodiment of the present invention.

Referring to FIG. 10, the eNB includes a controller 1000, a transmission unit 1010, a reception unit 1020, and a memory 1030.

The controller 1000 controls the overall operation of the eNB by controlling the transmission unit 1010, the reception unit 1020 and the memory 1030. The transmission unit 1010 and the reception unit 1020 perform wireless communication with a UE, and the memory 1030 stores a variety of information generated or received by operation of the eNB.

Figure 11:
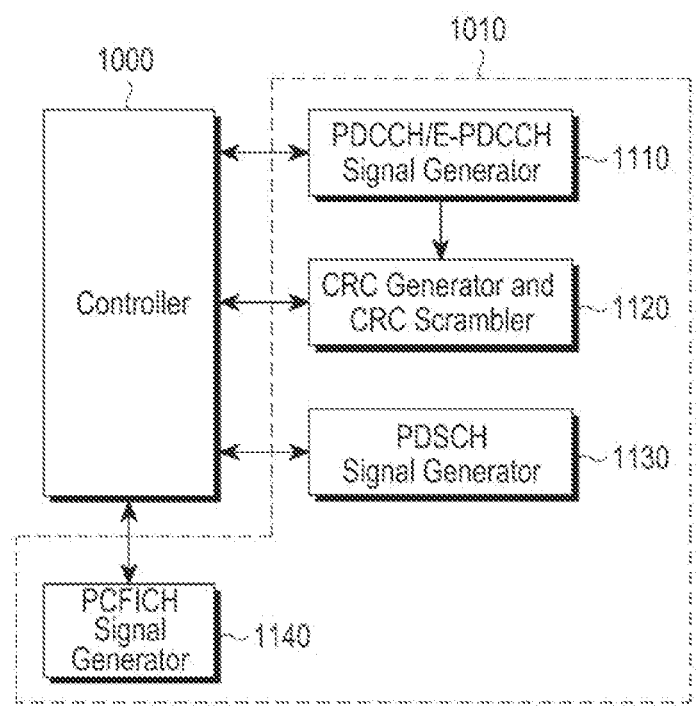
FIG. 11 is a diagram illustrating an internal structure of a transmission unit in an eNB according to an embodiment of the present invention.

In order to perform an operation of transmitting information about a PDSCH starting position according to an embodiment of the present invention, the transmission unit 1010 includes a PDCCH/E-PDCCH signal generator 1110, a CRC generator and CRC scrambler 1120, a PDSCH signal generator 1130 and a PCFICH signal generator 1140, as illustrated in FIG. 11.

The controller 1000 determines CRS overhead in a specific subframe and RB, and a size of a control region, or determines their associated information. Based on this information, the PDCCH/E-PDCCH signal generator 1110 determines which information the generator will transmit over a PDCCH/E-PDCCH, and generates a pertinent signal. Further, the controller 1000 determines which information the PCFICH signal generator 1140 will transmit over a PCFICH, and generates a pertinent signal. The information transmitted over a PDCCH/E-PDCCH is transmitted together with CRC generated in the CRC generator and CRC scrambler 1120, and the CRC is scrambled with any one of P-RNTI, SI-RNTI and C-RNTI depending on which information is transmitted to the UE. A PDSCH scheduled by the PDCCH/E-PDCCH is generated by the PDSCH signal generator 1130.

Figure 12:
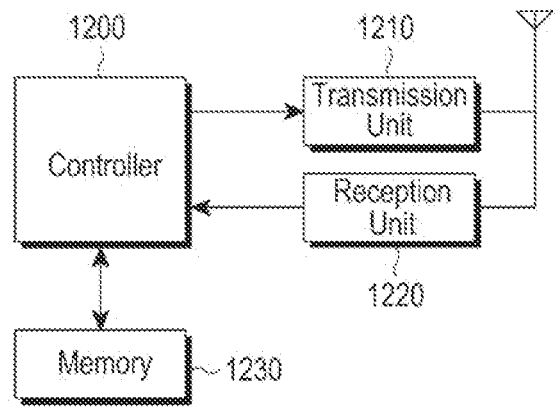
FIG. 12 is a diagram illustrating an internal structure of a UE according to an embodiment of the present invention.

FIG. 12 is a diagram illustrating an internal structure of a UE according to an embodiment of the present invention.

Referring to FIG. 12, the UE includes a controller 1200, a transmission unit 1210, a reception unit 1220, and a memory 1230.

The controller 1200 controls the overall operation of the UE by controlling the transmission unit 1210, the reception unit 1220, and the memory 1230. The transmission unit 1210 and the reception unit 1220 perform wireless communication with an eNB, and the memory 1230 stores a variety of information generated or received by operation of the EU.

Figure 13:
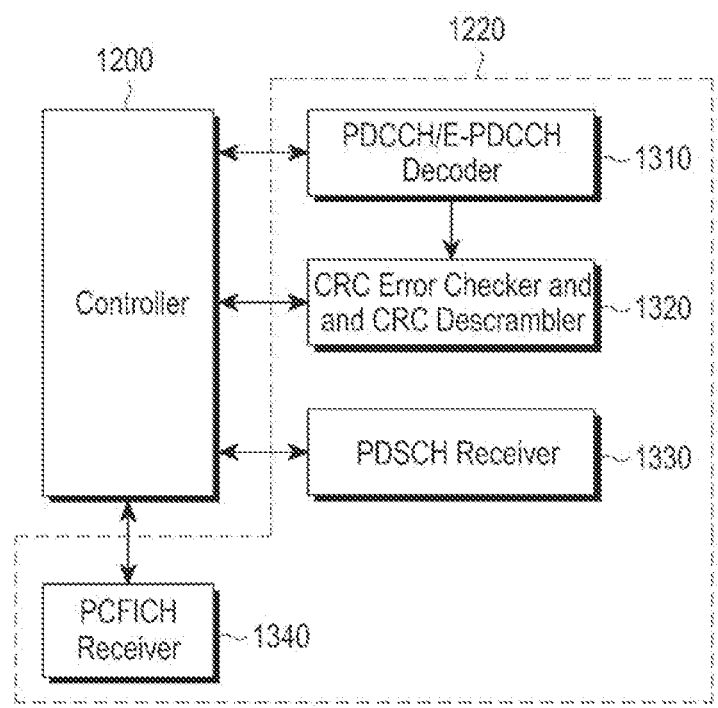
FIG. 13 is a diagram illustrating an internal structure of a reception unit in a UE according to an embodiment of the present invention.

In order to perform an operation of receiving information about a PDSCH starting position according to an embodiment of the present invention, the reception unit 1220 includes a PDCCH/E-PDCCH decoder 1310, a CRC error checker and CRC descrambler 1320, a PDSCH receiver 1330, and a PCFICH receiver 1340, as illustrated in FIG. 13.

The PDCCH/E-PDCCH decoder 1310 receives control information transmitted over a PDCCH/E-PDCCH. The PCFICH receiver 1340 receives information about a control region size transmitted over a PCFICH. The control information decoded by the PDCCH/E-PDCCH decoder 1310 is transferred to the CRC error checker and CRC descrambler 1320 together with the CRC which is received with the control information at the same time. The CRC error checker and CRC descrambler 1320 determines which RNTI of P-RNTI, SI-RNTI, C-RNTI is used, and transfers the results to the controller 1200. The controller 1200 determines a PDSCH starting position based on the control information transmitted over a PDCCH/E-PDCCH, and the type of RNTI determined by the CRC error checker and CRC descrambler 1320, and transfers the determined PDSCH starting position to the PDSCH receiver 1330. Then, the PDSCH receiver 1330 receives a PDSCH using the PDSCH starting position received from the controller 1200.

As apparent from the foregoing description, an eNB according to an aspect of the present invention, transmits information about wireless resources used to transmit data, to a UE in a wireless communication system in which a CoMP scheme is used, allowing the UE to correctly receive and decode data, to efficiently manage time and frequency resources.

While the present invention has been shown and described with reference to certain embodiments thereof, it will be understood by those skilled in the art that various changes in form and detail may be made therein without departing from the spirit and scope of the invention as defined by the appended claims and their equivalents.

What is claimed is:

1. A method for receiving data by a receiver in wireless communications, the method comprising:
   receiving configuration information including one or more resource element (RE) mapping parameter sets via higher layer signaling;
   receiving downlink control information comprising an information field indicating one of the one or more RE mapping parameter sets included in the configuration information on a physical downlink control channel (PDCCH);
   determining a parameter set for a physical downlink shared channel (PDSCH) based on an RE mapping parameter set indicated by the information field; and
   receiving data on the PDSCH based on the determined parameter set,
   wherein the RE mapping parameter set includes information on a starting position of the PDSCH in a subframe, cell-specific reference signal (CRS) resource information, and multicast broadcast single frequency network (MBSFN) subframe configuration information.

2. The method of claim 1, wherein the downlink control information is included in a control message having a cyclic redundancy check (CRC) scrambled with a cell radio network temporary identifier (C-RNTI).

3. The method of claim 1, wherein the information field is two bits.

4. A method for transmitting data by a transmitter in wireless communications, the method comprising:
- transmitting configuration information including one or more resource element (RE) mapping parameter sets via higher layer signaling;
- determining a parameter set for a physical downlink shared channel (PDSCH) based on one of the one or more RE mapping parameter sets included in the configuration information;
- transmitting downlink control information comprising an information field indicating the one of the one or more RE mapping parameter sets, on a physical downlink control channel (PDCCH); and
- transmitting data on the PDSCH according to the determined parameter set,
- wherein the RE mapping parameter set includes information on a starting position of the PDSCH in a subframe, cell-specific reference signal (CRS) resource information, and multicast broadcast single frequency network (MBSFN) subframe configuration information.

5. The method of claim 4, wherein the downlink control information is included in a control message having a cyclic redundancy check (CRC) scrambled with a cell radio network temporary identifier (C-RNTI).

6. The method of claim 4, wherein the information field is two bits.

7. A receiver in wireless communications, the receiver comprising:
- a transceiver; and
- a controller configured to:
  - receive configuration information including one or more resource element (RE) mapping parameter sets via higher layer signaling,
  - receive downlink control information comprising an information field indicating one of the one or more RE mapping parameter sets included in the configuration information on a physical downlink control channel (PDCCH),
  - determine a parameter set for a physical downlink shared channel (PDSCH) based on an RE mapping parameter set indicated by the information field, and
  - receive data on the PDSCH based on the determined parameter set,
- wherein the RE mapping parameter set includes information on a starting position of the PDSCH in a subframe, cell-specific reference signal (CRS) resource information, and multicast broadcast single frequency network (MBSFN) subframe configuration information.

8. The receiver of claim 7, wherein the downlink control information is included in a control message having a cyclic redundancy check (CRC) scrambled with a cell radio network temporary identifier (C-RNTI).

9. The receiver of claim 7, wherein the information field is two bits.

10. A transmitter in wireless communications, the transmitter comprising:
- a transceiver; and
- a controller configured to:
  - transmit configuration information including one or more resource element (RE) mapping parameter sets via higher layer signaling,
  - determine a parameter set for a physical downlink shared channel (PDSCH) based on one of the one or more RE mapping parameter sets included in the configuration information,
  - transmit downlink control information comprising an information field indicating the one of the one or more RE mapping parameter sets, on a physical downlink control channel (PDCCH), and
  - transmit data on the PDSCH according to the determined parameter set,
- wherein the RE mapping parameter set includes information on a starting position of the PDSCH in a subframe, cell-specific reference signal (CRS) resource information, and multicast broadcast single frequency network (MBSFN) subframe configuration information.

11. The transmitter of claim 10, wherein the downlink control information is included in a control message having a cyclic redundancy check (CRC) scrambled with a cell radio network temporary identifier (C-RNTI).

12. The transmitter of claim 10, wherein the information field is two bits.

* * * * *